(12) United States Patent
Joppa et al.

(10) Patent No.: US 9,223,745 B2
(45) Date of Patent: Dec. 29, 2015

(54) FLEXIBLE DATABASE AND ITERATIVE SPATIAL SEARCH PROCESS

(75) Inventors: Lucas Neal Joppa, Swavesey (GB); Andrew Bryan Roberts, Macclesfield (GB); Richard James Williams, Santa Cruz, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 311 days.

(21) Appl. No.: 13/351,828

(22) Filed: Jan. 17, 2012

(65) Prior Publication Data

US 2013/0185281 A1 Jul. 18, 2013

(51) Int. Cl.
*G06F 15/16* (2006.01)
*G06F 17/30* (2006.01)

(52) U.S. Cl.
CPC .......... *G06F 15/16* (2013.01); *G06F 17/30241* (2013.01)

(58) Field of Classification Search
CPC .................... G06F 17/30551; G06F 17/30483; G06F 17/30241; G06F 17/30395; G06F 15/16
USPC ......... 707/714, 769, 706, 718, 723, 724, 729, 707/E17.014, E17.017
See application file for complete search history.

(56) References Cited

U.S. PATENT DOCUMENTS

| | | | |
|---|---|---|---|
| 8,350,849 B1 * | 1/2013 | Jones et al. | 345/419 |
| 2006/0294065 A1 * | 12/2006 | Dettinger et al. | G06F 17/30551 1/1 |
| 2007/0016897 A1 * | 1/2007 | Todd | 717/143 |
| 2009/0094197 A1 | 4/2009 | Fein et al. | |
| 2011/0022622 A1 | 1/2011 | Boroczky et al. | |

OTHER PUBLICATIONS

Heinzle, et al., "Spatial Data Interpretation for the Intelligent Access to Spatial Information in the Internet", In Proceedings of 21st International Cartographic Conference, Aug. 16, 2003, 10 pages.

Lynnes, et al., "Mirador: A Simple Fast Search Interface for Global Remote Sensing Data Sets", In Proceedings of IEEE Transactions on Geoscience and Remote Sensing, vol. 47, Issue 1, Dec. 17, 2008, pp. 92-96.

Ahmed, et al., "Web Content Mining: A Solution to Consumer's Product Hunt", In Proceedings of World Academy of Science, Engineering and Technology, Issue 37, 2008, pp. 291-295.

(Continued)

*Primary Examiner* — Md. I Uddin
(74) *Attorney, Agent, or Firm* — Steve Wight; Judy Yee; Micky Minhas

(57) ABSTRACT

A flexible database and iterative spatial search process is described. In an embodiment, a flexible database server is described which takes input queries in the form of XML strings describing a search specification and parses them using a stored procedure. Searching is performed by generating a temporary table for each term in the search specification and then comparing the temporary tables to pre-existing tables within the database to identify datasets that meet the search specification. An application is also described which generates the XML string in response to user input and which displays the results to a user. The application provides a user interface which enables users to select attributes of results, such as the spatial data associated with a dataset, to include in a second search specification and to trigger this new search.

18 Claims, 10 Drawing Sheets

(56) References Cited

OTHER PUBLICATIONS

Funkhouser, et al., "A Search Engine for 3D Models", In Journal of ACM Transactions on Graphics, vol. 22, Issue 1, Jan. 2003, pp. 83-105.

Purves, et al., "A Cartographic Visualisation Interface for Spatial Information Retrieval", In Proceedings of International Cartographic Conference, 2005, pp. 1-8.

Newton, Glen, "Drill Clouds", Retrieved on: Oct. 12, 2011, Available at: http://lab.cisti-icist.nrc-cnrc.gc.ca/cistilabswiki/index.php/Drill_Clouds#Drill_Clouds.

Khirni, et al., "Query Interface Design", Retrieved on: Oct. 12, 2011, Available at: http://www.geo-spirit.org/publications/SPIRIT_WP4_D7.pdf.

* cited by examiner

FLEXIBLE DATABASE AND ITERATIVE SPATIAL SEARCH PROCESS

BACKGROUND

Spatial data, or spatial datasets, comprise points or areas in geographical space and some data about the particular region defined by the points/areas. For example, a spatial dataset may comprise data defining an area of the world and some environmental data relating to that area (e.g. the presence of a particular species). Spatial search allows a user to search the spatial data over user-defined regions; however it can be difficult for a user to adequately specify the spatial extent of their search or to refine their search to hone in on the desired results.

The embodiments described below are not limited to implementations which solve any or all of the disadvantages of known methods of searching spatial data.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

A flexible database and iterative spatial search process is described. In an embodiment, a flexible database server is described which takes input queries in the form of XML strings describing a search specification and parses them using a stored procedure. Searching is performed by generating a temporary table for each term in the search specification and then comparing the temporary tables to pre-existing tables within the database to identify datasets that meet the search specification. An application is also described which generates the XML string in response to user input and which displays the results to a user. The application provides a user interface which enables users to select attributes of results, such as the spatial data associated with a dataset, to include in a second search specification and to trigger this new search.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

As described above, in current spatial search applications, it is difficult for a user to suitably define the spatial extent of a search or to subsequently refine the spatial extent of a search. Current search processes (and in particular spatial search processes) are linear: the user defines the search criteria, performs a query and looks at the returned results and selects the actual datasets of interest. If the returned results do not contain the data of interest, or if the search returns too many results for the user to be able to use, the user typically refines their search by either broadening or restricting their search criteria. This involves returning to the initial search query user interface and manually editing the search criteria originally input by the user. The user may have gained insight by looking at the previous search results but there is no direct connection between the search results and the search criteria (which may also be referred to as a search specification).

Figure 1:
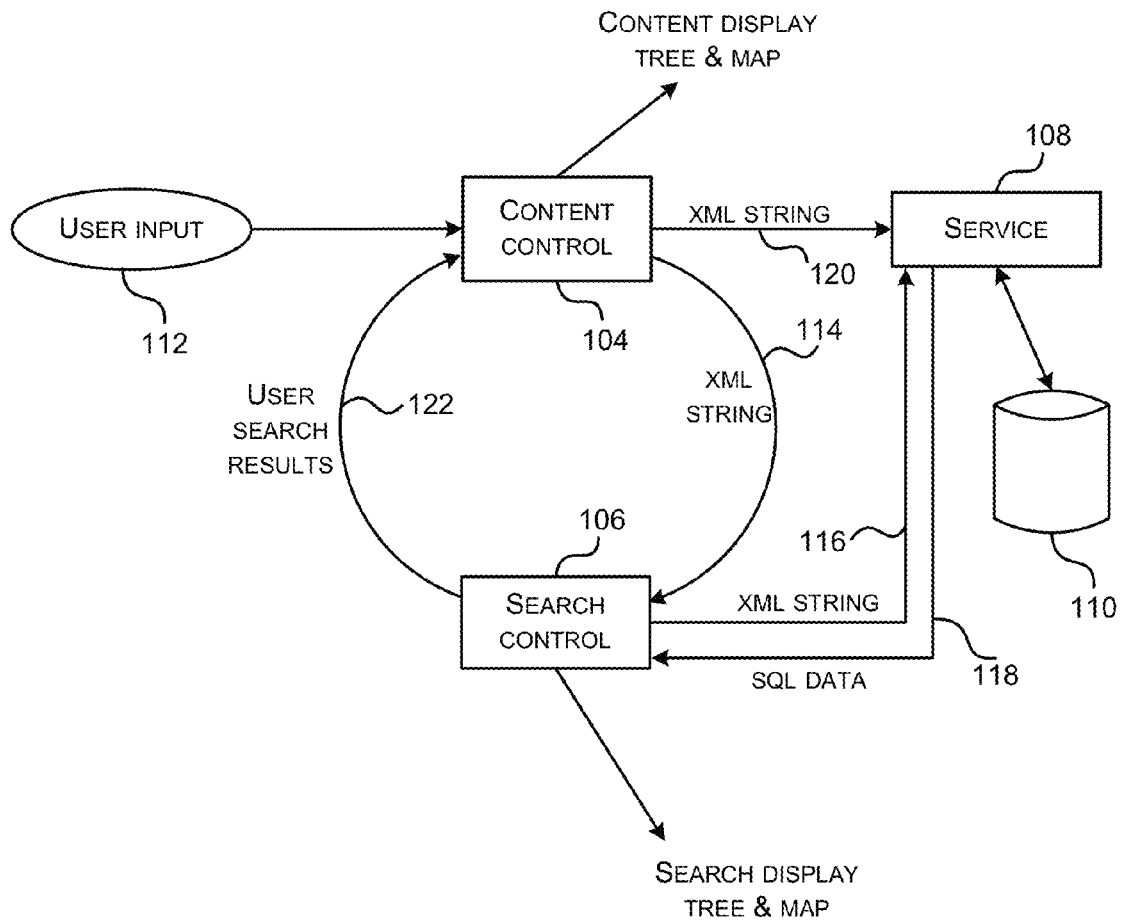
FIG. 1 shows a schematic diagram of an iterative search process.

FIG. 1 shows a schematic diagram of an iterative search process. The schematic diagram shows two elements of a spatial search application, a content control 104 and a search control 106. Both of these controls 104, 106 communicate with a service 108 (which may be a WCF service) which controls interaction with a database (or database server) 110 and so may be referred to as an 'interface service'. The database 110 stores the spatial datasets and in some examples there may be more than one database.

Figure 2:
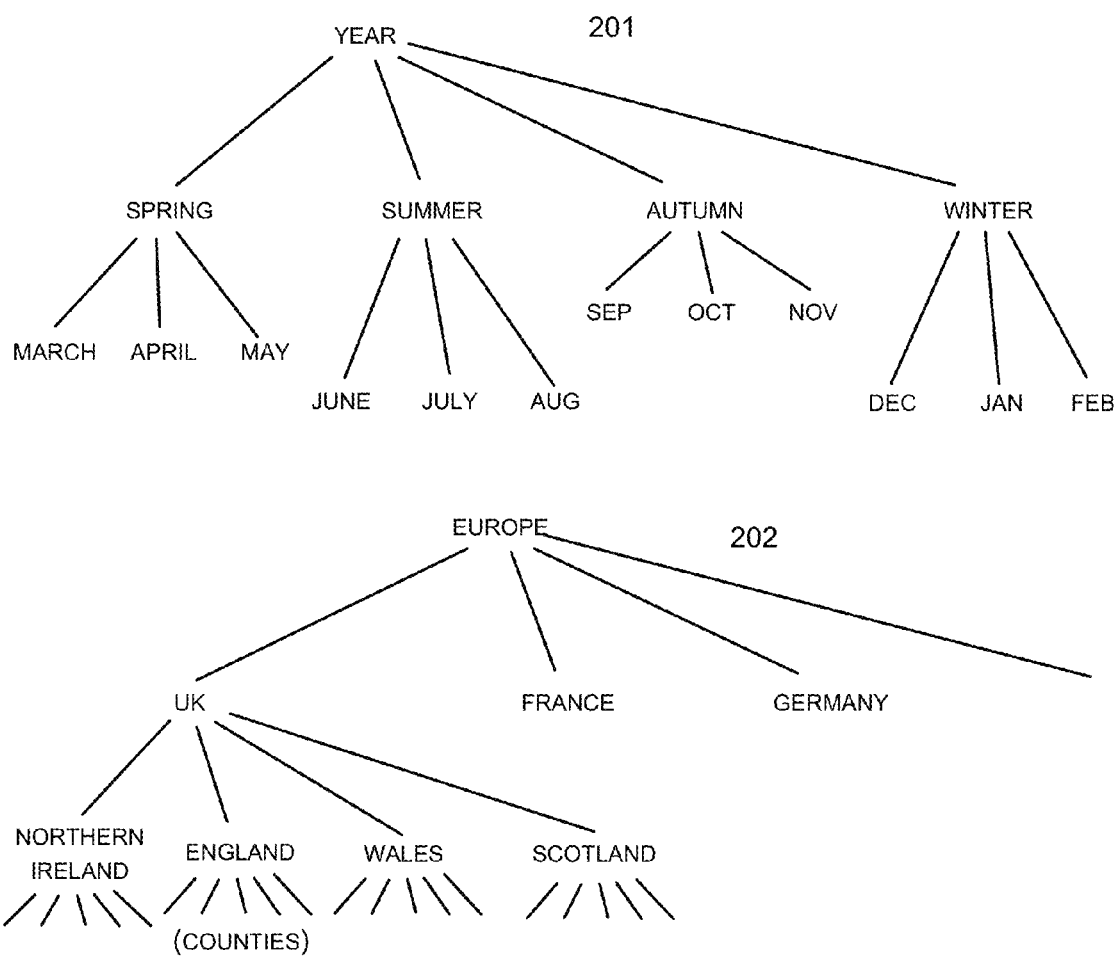
FIG. 2 shows two examples of hierarchical vocabularies.

The spatial datasets which are stored in the database 110 are classified (or indexed) according to one or more vocabularies which may be system-defined or user-defined. Each vocabulary may be flat in structure (e.g. year ranges) or hierarchical (e.g. taxonomy of species, geopolitical boundaries, music classification) and within a hierarchical vocabulary the various levels are nested. Two simple examples of hierarchical vocabularies are shown in FIG. 2. The first 201 divides a year into seasons and then months and the second 202 is a part of a geopolitical vocabulary for Europe. User-defined vocabularies are described in more detail below.

In order to perform a search, a user specifies initial search criteria (e.g. via various user entry controls within the spatial search application) and this user input 112 is received by the content control 104 and passed in the form of an XML string to the search control 106 (arrow 114). The search control 106 transmits the XML string to the service 108 (arrow 116) which in turn inputs the XML string to a stored procedure running on the database 110. The stored procedure parses the XML string in order to be able to perform the search (as described in more detail below) and returns search results comprising one or more spatial datasets to the search control 106 via the service 108. The search control 106 interprets the SQL format data received from the service (arrow 118) and packages the results for display in the content control 104 to the user.

Figure 3:
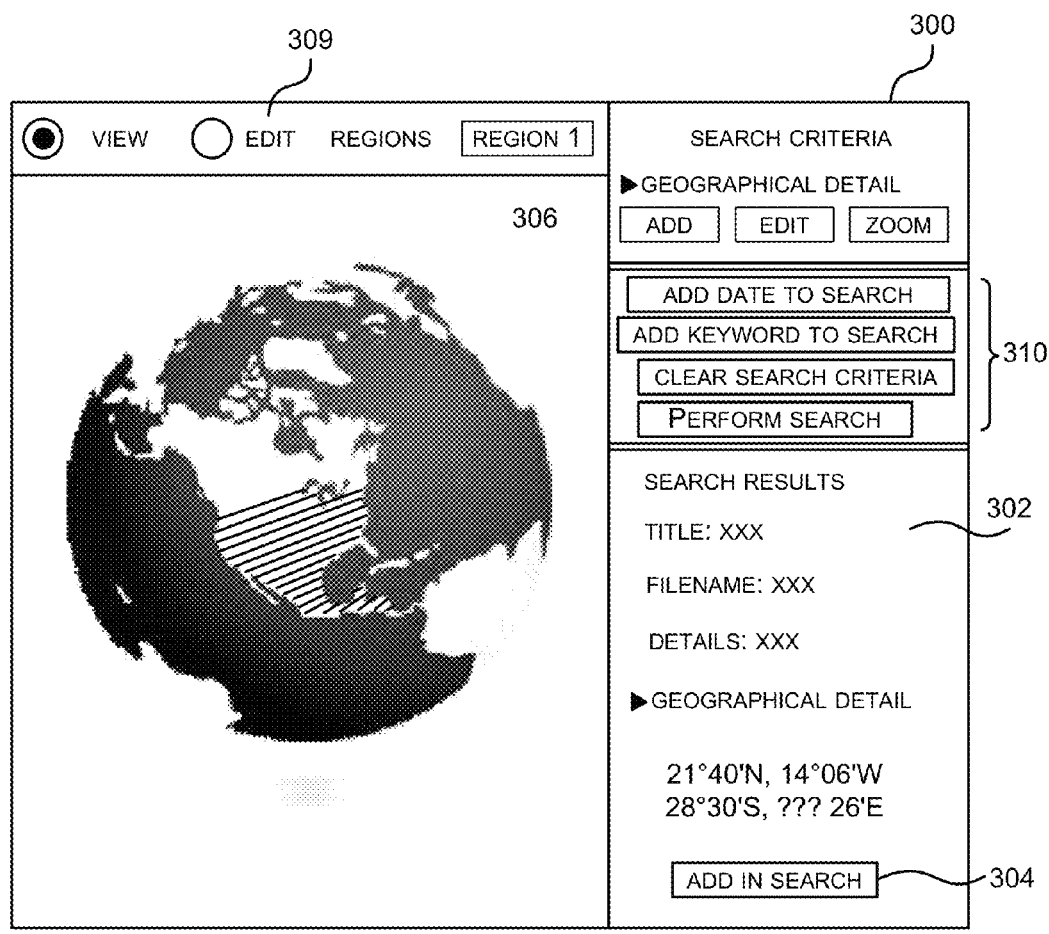
FIG. 3 shows an example user interface for the search process of FIG. 1.

The set of results which is displayed to the user can be used directly to refine or redefine the search criteria. FIG. 3 is an example user interface (UI) 300 which shows a set of results 302 and all or part of these results can be quickly and easily added to the search criteria by pressing the 'add to search' button 304 (e.g. in a single user operation without requiring cutting and pasting or manual transcription of results). In many examples, the search results display the datasets that meet the search criteria and also the attributes of the dataset, e.g. those vocabulary terms that classify a dataset or the spatial data associated with a dataset. A user can add an attribute (e.g. a vocabulary term) to the search criteria in addition to or instead of another aspect of the dataset. In some examples, the spatial data may be considered a vocabulary (either flat or hierarchical) or the spatial data may be considered a spatial attribute of a dataset.

The revised search criteria (or search specification) results in a new (or revised) XML string being passed from the content control 104 to the search control 104 (arrow 114) and to the service 108 for use in searching the database 110. In some examples, a user may delete the initial search criteria such that the revised search criteria is only based on the selected search result (e.g. the search criteria may only comprise one or more vocabulary terms that classify the selected search result or may only comprise the spatial data associated with one of the search results) and so the second search (performed using the new XML string) may identify a different (and in some examples, non-overlapping) set of results compared to the first search.

In an example, the database 110 stores spatial datasets that describe mammal ranges and other ecological data and each mammal range record contains the geographic range of a mammal species. Queries can be performed either on species names or on geographic areas. If a user wants to find all the mammals that live within the range of the lion, using the method shown in FIG. 1, they initially search the database for the name "Panthera leo" (the Latin name for lion) and the first search results include the record containing the geographic ranges of lions. A user can then select these spatial ranges (which are considered attributes, along with any vocabulary terms), move them to the search criteria and delete the name "lion" from the search criteria. The revised search criteria now define a search which finds all data that overlap with the lion's range (without requiring that data being searched is tagged with the keyword 'lion').

Using the iterative search method described above, new information can be discovered instead of simply refining search results to narrow down the set of results returned. In refining the search by adding attributes (e.g. vocabulary terms and/or spatial data) from a previous set of results (and deleting terms from the search criteria), a user can navigate through the data in the database from one node to adjacent nodes in any direction, rather than simply drilling down within the original data set returned by the search. This iterative search method can provide large degrees of separation between the final results obtained by the user and the original search criteria and/or original set of results returned to the user. There is no pre-defined path (or set of paths) along which a user progresses but instead the user is free to select/deselect attributes in order to iteratively refine the search criteria.

In the example given, there is some overlap between the results of the original search and the results of the subsequent search, but the results of the second search are not a subset of the results of the first search. In some examples, there may be no overlap between the first and second sets of results and in other examples, although there may be some overlap between the first and second sets of results, a subsequent search using search criteria which have been further revised may return a third set of results which are non-overlapping with the first set of results. For example, if a database comprises MP3 files with associated spatial data (e.g. detailing where the particular song/track was recorded) an initial search may be a spatial search for Seattle and this may return tracks by Jimi Hendrix and Kurt Cobain. Each track has an associated genre, as defined by a vocabulary and so a user may select the 'grunge' genre which is an attribute of a Kurt Cobain track in the search results. This revised search for 'grunge' will return the original Kurt Cobain track of that genre but may also return a track by, for example, Courtney Love which was recorded in Cesar's Palace in Las Vegas (as captured in the associated spatial data for the track). A user may then refine the search criteria by replacing the current criteria with the spatial attribute specifying Cesar's Palace in Las Vegas. This search may, for example, return tracks by Barry Manilow amongst others but will not return the original Jimi Hendrix or Kurt Cobain tracks from the first set of search results.

The use of an XML string as an input to a stored procedure on the database 110 to perform searching provides a flexible and efficient method of searching. The XML string provides freedom regarding the parameters which are input as search terms (which terms and how many are used) and freedom regarding the format of those parameters. Using such an XML string is possible to use a large number of heterogeneous parameters within the XML string to define the search criterion. As described above, the XML string is parsed by a stored procedure on the database and the search process which is performed by the database 110 is described in more detail below.

As also shown in FIG. 1, the content control 104 can also be used to add data to the database 110 via the service 108 (arrow 120) and in some examples, the feedback of data from the search control 106 to the content control 104 may be used in uploading new datasets which are to be tagged with the same attributes (i.e. which are classified in the same way according to one or more of the vocabularies used) as one of the datasets in the search results. In an example implementation, a user may select all the attributes of a search result (or a subset of those attributes) and then upload a new dataset. The attributes are described in the XML string sent to the service (arrow 120) along with the dataset (e.g. the attributes may be referenced by their vocabulary IDs) and the service stores the dataset in the database 110 along with the attributes. As described above, the service 108, which is referred to as an 'interface service' provides a means to communicate safely with the database.

It will be appreciated that the example UI 300 shown in FIG. 3 has been simplified for purposes of explanation and may contain additional controls, menus, etc. In the example shown, the UI 300 comprises a portion 306 which displays spatial results on a map (e.g. by shading an area 308) and associated controls for the map 309 and further buttons 310 for modifying the search criterion, performing the search, etc (these buttons 310 may comprise both entry controls for generic data and specialized user data entry controls).

Figure 4:
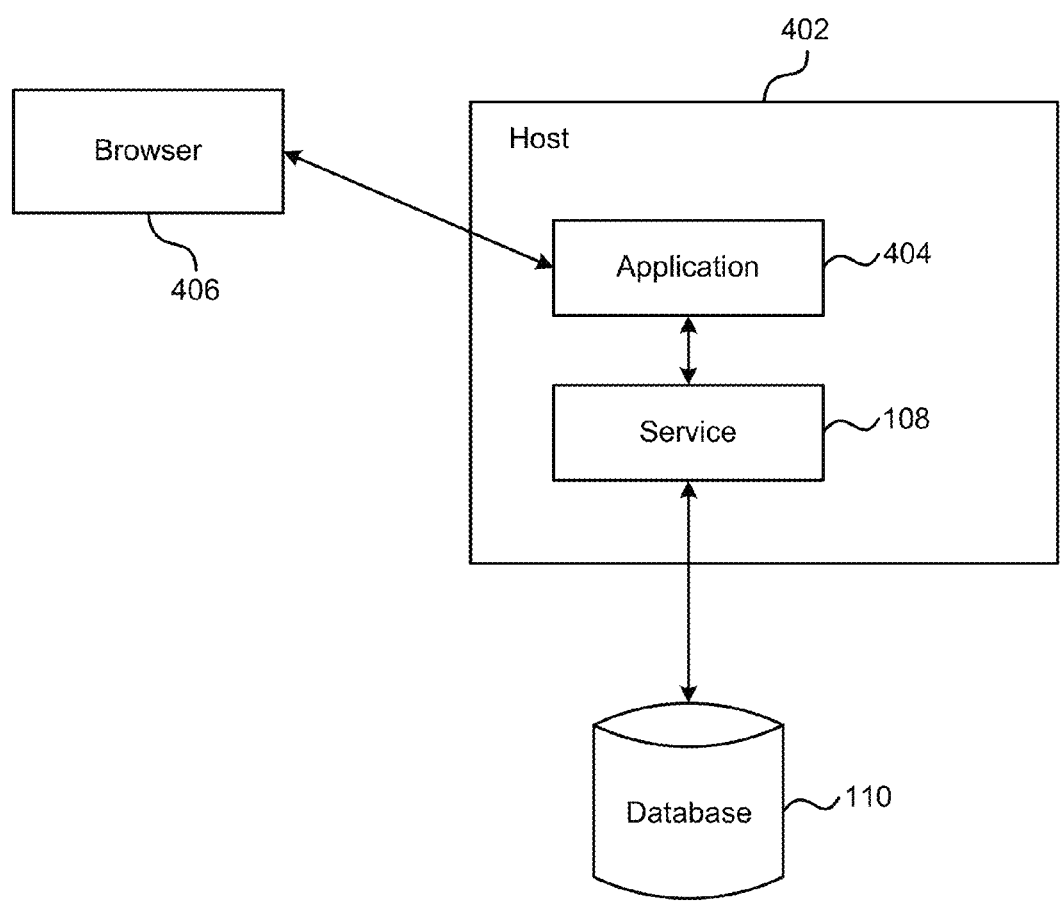
FIG. 4 shows a schematic diagram of a system which may be used to implement the iterative search method of FIG. 1.

FIG. 4 shows a schematic diagram of a system which may be used to implement the iterative search method described above. The system comprises a host 402 on which runs an application 404 and the service 108 described above. The application 404 provides a user interface (such as the example shown in FIG. 3) which is displayed to a user via a browser 406 and the application includes the content control 104 and search control 106 and is described in more detail below with reference to FIG. 5. Although FIG. 4 shows a single service 108, the 'interface service', running on the host, there may be multiple services, for example there may be a service which is arranged to pull in data from external sources and which may be referred to as a 'look-up service', as described in more detail below. In an example, the host 402 may be a cloud host (e.g. a Microsoft® Windows Azure™ host) and the database 110, which may be a SQL server, may be cloud-based database (e.g. Microsoft® Windows Azure™ storage).

Figure 5:
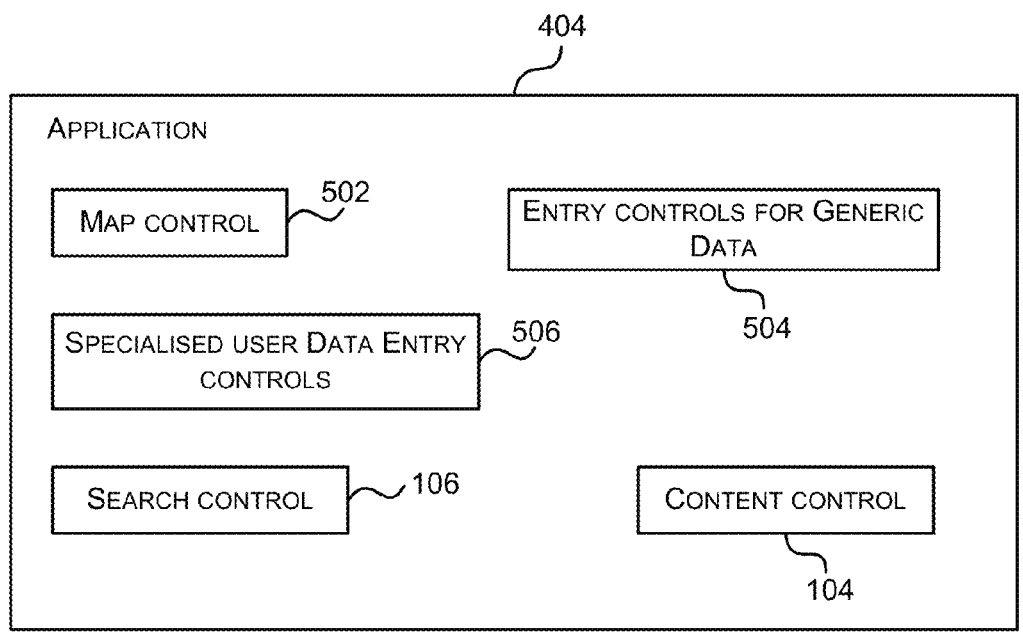
FIG. 5 is a schematic diagram of an application which may be used in the iterative search method of FIG. 1.

As shown in FIG. 5, the application 404 (which may be a Microsoft® Silverlight® application) may comprise, in addition to the content control 104 and search control 106 described above, a map control 502 and some user entry controls 504, 506. The map control 502 (which may be a Bing Maps Silverlight® control) provides an I/O to the map canvas (e.g. to the Bing Map canvas), e.g. using the Bing Maps API and SDK to allow a user to input shapes on the map canvas and to interpret such a user input in order to enable the data to be captured and stored in the database 110. The user entry controls may include entry controls 504 for generic data and specialized user data entry controls 506, such as a location look-up control which interfaces with a geocode service (such as Bing Maps Geocode service) which matches an address or place to a map location (geocoding, e.g. which provides the coordinates of Cambridge in response to the textual input 'Cambridge') or returns geographic entities or addresses found at a given location (reverse geocoding) and an import control for shape (.shp) files so that they can be uploaded and used as a search input by a user.

The specialized user data entry controls 506 may also comprise a user vocabulary administration control which enables users to create and upload their own vocabularies. In addition to, or instead of, uploaded entirely new vocabularies, a user can upload a vocabulary which is then inserted as a sub-category within an existing vocabulary. This can be powerful when searching as the sub-categories of the newly uploaded vocabulary inherit the categories above it in the existing vocabulary. This user vocabulary administration control communicates with the service 108 such that the vocabulary information can be stored in database 110.

Once a user has uploaded a new vocabulary, they can tag existing or new datasets with the new vocabulary. In order to tag existing stored datasets with the new vocabulary (i.e. to specify new attributes for the stored dataset), the application (the content control 104) sends an XML string identifying the dataset and the attributes to the service 108 (arrow 120) and the service (the interface service) then updates the database 110.

The specialized user data entry controls 506 may also comprise specific controls which relate to any system-specified vocabularies. For example, a system may include a taxonomy of species as a standard vocabulary and a taxonomy control may be provided which communicates with a second service (the look-up service) on the host 402 (not shown in FIG. 4). This second service may be arranged to pull in data from external data sources (e.g. the Catalogue of Life, www-.cataogueoflife.org), e.g. to extract vocabularies from an external data source which may then be stored (by the interface service) in the database 110.

Figure 6:
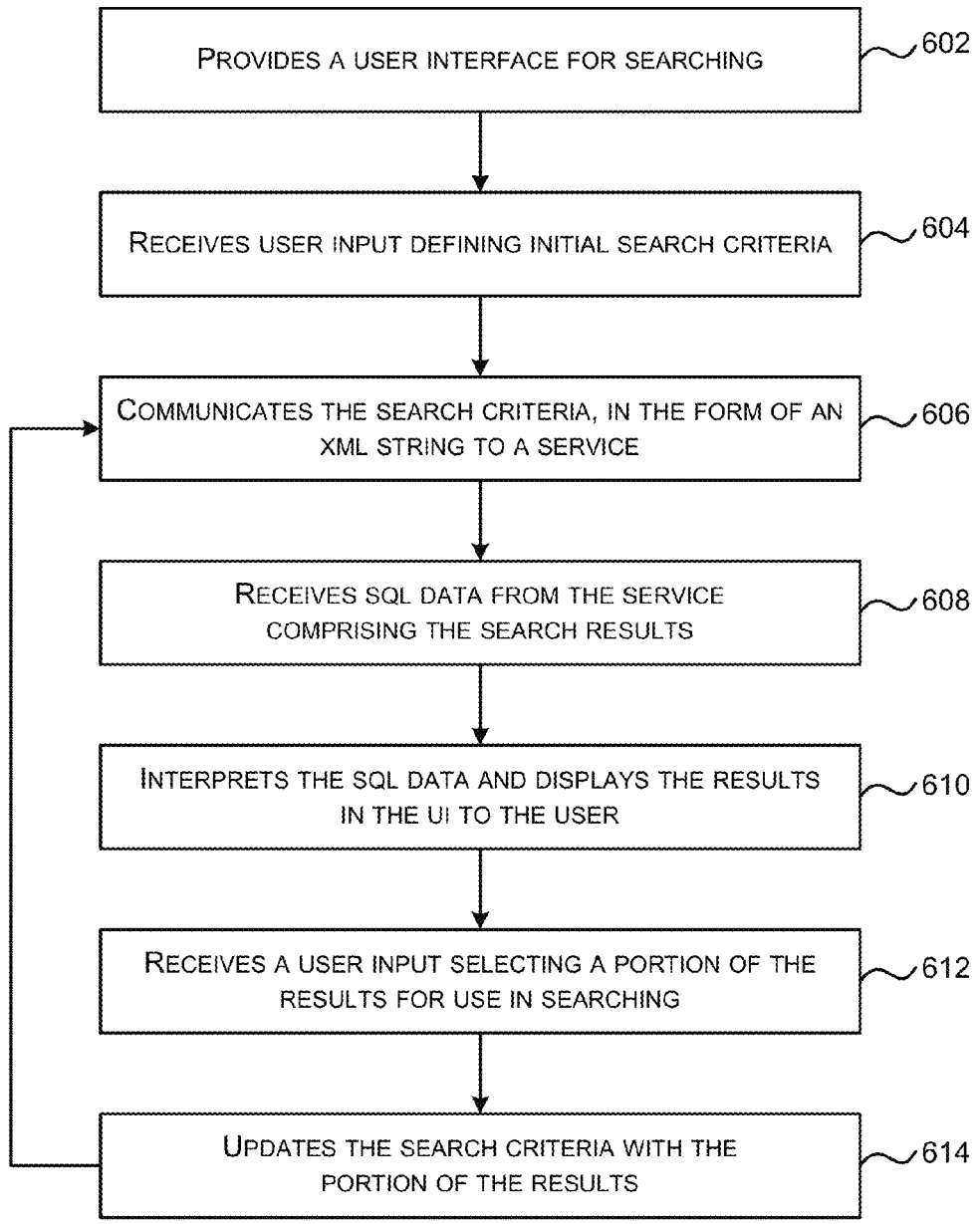
FIG. 6 is a flow diagram of an example method of operation of an application as shown in FIG. 5.

An example method of operation of the application 404 is shown in FIG. 6. As described above, the application provides a user interface for searching (block 602), receives a user input (via the UI) defining initial search criteria (block 604) and communicates the search criteria in the form of an XML string to an interface service which interfaces to the database (block 606 and arrow 116 in FIG. 1). The application receives SQL data comprising the search results from the interface service (block 608 and arrow 118 in FIG. 1), it interprets the data and presents the search results to the user in the UI (block 610). As a result of displaying the search results, the application may receive a further user input selecting a portion of the results (e.g. a dataset or an attribute) for inclusion within the search criteria (block 612) and as a result, the application updates the search criteria (block 614). The method then sends a second XML string to the interface service (block 606) and the methods continues as above.

In a further example, the application 404 may have three different modes of operation: search, data entry and administration (or admin). The operation of the application 404 in search mode is shown in FIG. 6 and described above and this mode enables a user to perform text or spatial searches. In data entry mode, users can upload datasets and tag (or classify) new or existing datasets using the available vocabularies. In the administration (or admin) mode, a user can upload new vocabularies and where a newly uploaded vocabulary links into an existing vocabulary, a user can specify this linking between vocabularies. This linking enables the vocabulary to be correctly stored and indexed in the database (as described below). The application 404 may provide a different UI for each mode of operation and buttons or other controls may be provided to enable a user to switch between modes of operation.

The provision of all three modes, and in particular the admin mode, enables user to define their own vocabularies which may be specific to their interests or to the type of data that they are using and exploring using the search mode. This makes the system very flexible and very customizable by users. The application may be further customized through the user of user-defined skins. It is the use of vocabularies, whether system or user defined, which provides the flexibility to the iterative search method and enables users to discover new data by refining the search criterion rather than simply drill down within a dataset returned in response to a search query.

Figure 7:
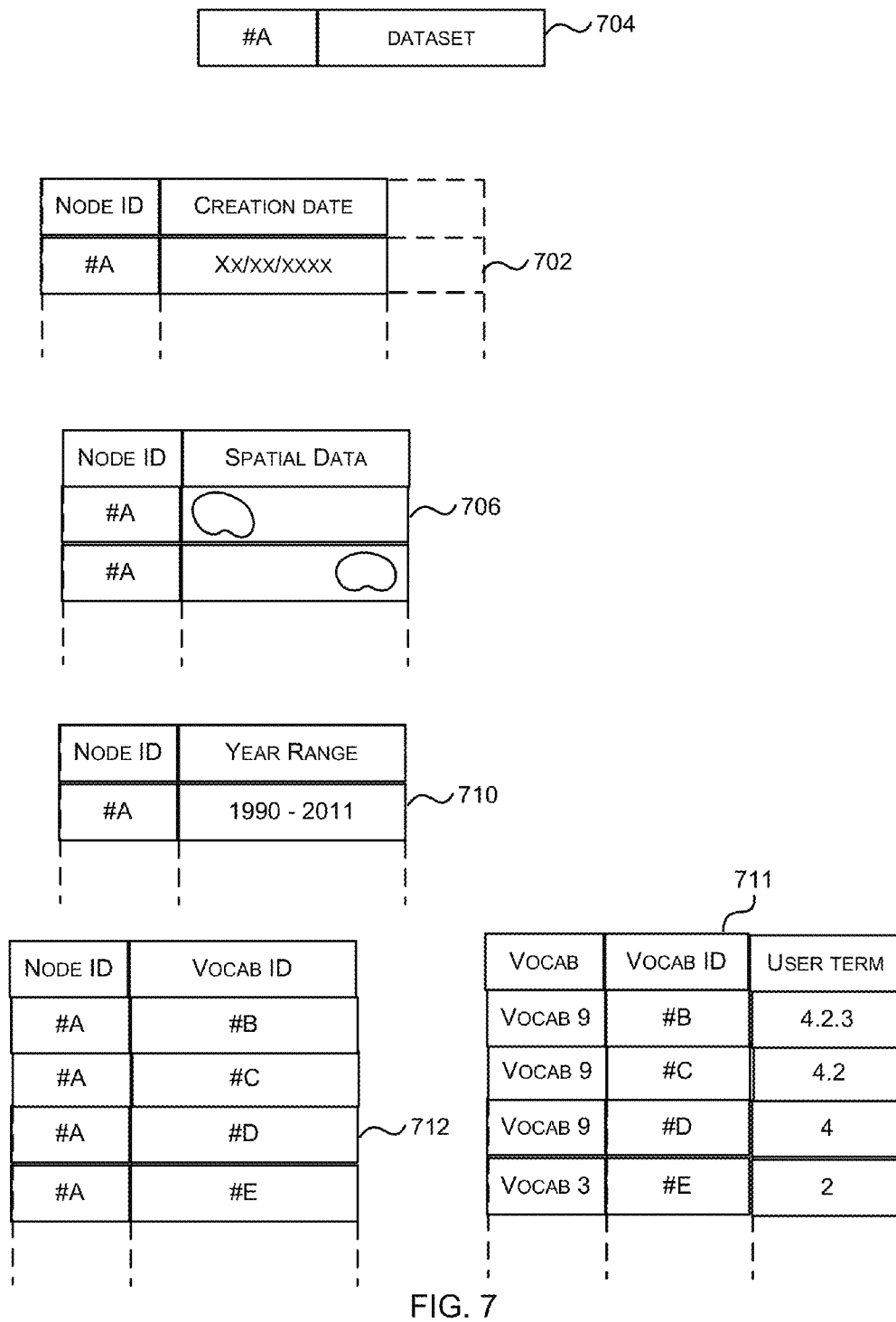
FIG. 7 shows an example graphical representation of the contents of a database.

FIG. 7 shows an example graphical representation of the contents of the database 110. Within the database, each element of data (or entry in the database) is stored associated with a node ID and a node may be described as a sticking point or focal point for data and any data shared with a node has the same node ID (e.g. #A in the example shown in FIG. 7). The only data in the database which is stored without reference to a node ID is the basic vocabulary data. Although a node relates to a particular dataset, it also relates to other information associated with the dataset, such as vocabularies, and so the node (or the node ID which identifies the node) provides a new referencing system for the database and is used to bundle together data and vocabularies.

The datasets stored in the database 110 may comprise datasets which have been entered or imported by a user, datasets which have been purchased from another user (e.g. via a data market) and/or data which is provided for the user by the system provider. In an example, a user may import data in the form of a Microsoft® Excel table and on input may identify particular columns (or rows) as containing terms in a vocabulary which can be used to classify the corresponding data element. In another example, the system (e.g. the application) may automatically create a vocabulary based on the data being imported and then classify the data according to the newly created vocabulary. The newly created vocabulary may then constitute a standalone vocabulary or may be linked (automatically or manually) to an existing vocabulary.

As shown in FIG. 7 the database comprises a first table 702 which lists node IDs and the creation date and/or time of that node. This table 702 may also include other information about the node creation, such as one or more of: the title of the node (or the associated dataset), the user that uploaded the dataset, etc. The database also comprises a dataset record 704 associated with the particular node ID, #A. For spatial data, the dataset comprises spatial information which identifies a location or region of the world and data relating to the location/region. The spatial information is stored in a separate table 706 and this dataset record 704 contains the data relating to the location/region. Using an earlier example, where the dataset contains mammal ranges and other ecological data, the spatial data table 706 stores the geographic range data (as represented by the irregular shapes 708 shown in FIG. 7) and the dataset record 704 stores the information about the mammal species. A dataset generally corresponds to a single data file (e.g. a Microsoft® Excel® file) or a set of closely related files (e.g. two photos of a bird taken at the same place and at the same time). The example shown in FIG. 7 has two non-overlapping spatial regions associated with the node and there are two entries in the spatial data table 706. In other examples, there may be a single entry in the spatial data table 706 which contains both the spatial regions.

The spatial data, which is stored in the spatial data table 706 is one example of data which characterizes the node and is therefore considered an attribute of the node. Other characterizing data for the node (and hence the dataset) may be stored in other tables 710-712 and all the characterizing data is linked through the use of node ID. Table 710 is a table associated with a fixed (system-specified) vocabulary (date ranges in this example) and tables 711-712 relate to the user-defined vocabularies. Table 711 is a table of vocabulary items (and is not linked specifically to node IDs) and this table assigns vocabulary item IDs (or Vocab IDs) to particular vocabularies (referred in this example as VOCAB N, where N is a number) and links the Vocab IDs to user-understandable terms (e.g. 'Grunge', 'Rock', etc in the music database example given above). In the example shown, each Vocab ID is unique across all vocabularies. Table 712 links Node IDs and Vocab IDs and as shown in FIG. 7, if a node is linked to a lower level in a hierarchy (e.g. 4.2.3), there are entries in this linking table 712 for each level in the hierarchy (e.g. 4.2.3 and 4.2 and 4).

It will be appreciated that in other examples there may be more than one system-defined vocabulary and this data may be combined in a single table or in separate tables (e.g. there may be a separate taxonomy table). Similarly the user-defined vocabulary data may be contained within one or more tables and in some examples, the tables may contain both the system-specified vocabulary data and the user-defined vocabulary data (e.g. there may be a pair of tables 711-712, with each table containing both system-specified and user-defined vocabulary data and there may be no separate table 710).

In the example shown in FIG. 7, the vocabulary data table 711 uses vocabulary identifiers (e.g. 'VOCAB N') to identify a particular vocabulary to which it refers and an index (e.g. '4.2.3') to refer to a particular level within that vocabulary. This index is the user-understandable term and is used herein by way of example to highlight the hierarchical nature of VOCAB 9. In an actual implementation, the user-understandable terms may be strings such as 'Spring' or 'France', as shown in the examples of FIG. 2.

Figure 8:
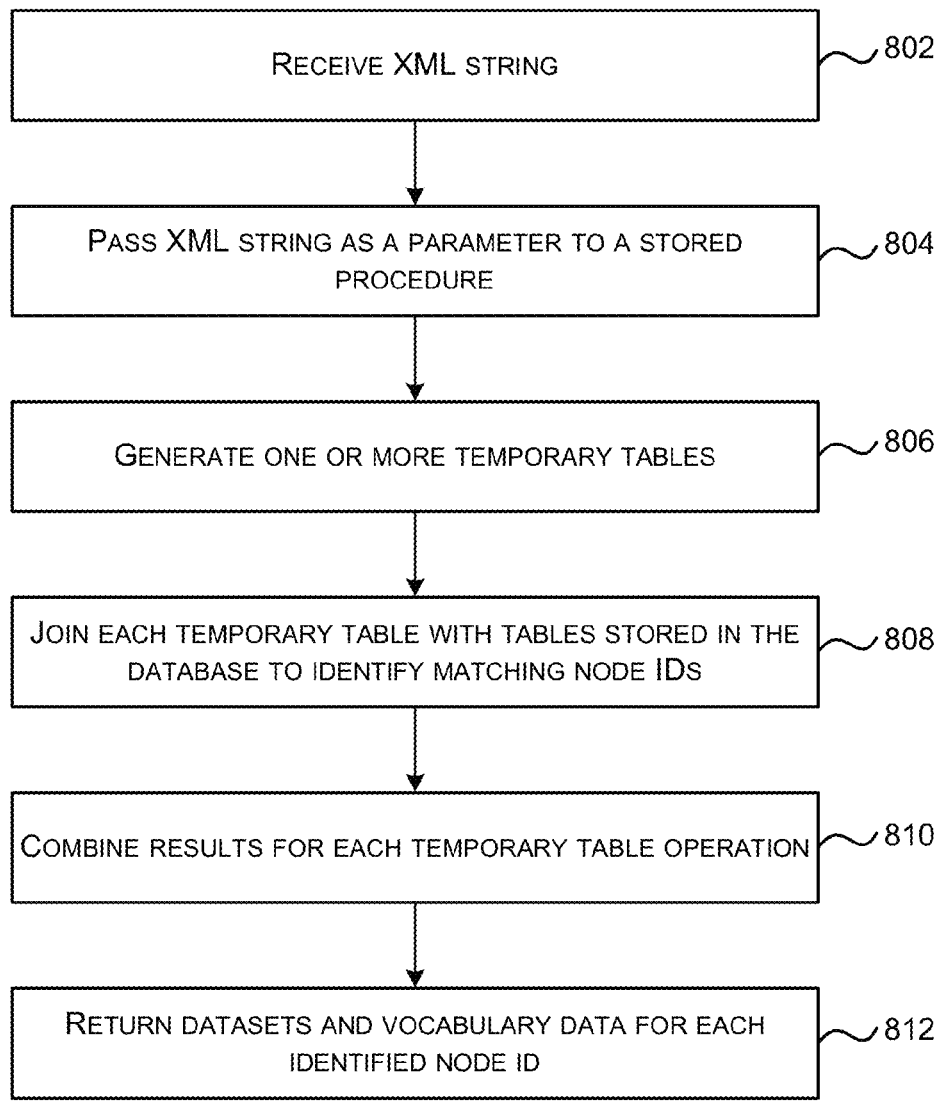
FIG. 8 shows an example method of operation of a database.

An example method of operation of the database 110 is shown in FIG. 8. As described above, the database 110 receives an XML string (block 802) which was generated by the application 404 (by content control 104) based on a user input. This XML string describes the search criterion (or search specification) and is passed as a parameter to a stored procedure within the database 110 (block 804) in order to generate one or more temporary tables (block 806). In an example, one temporary table may be generated for each search query term. In an example, the XML string may include the search query term 'Lion' which may be translated to 'VOCAB 9 4.2' and so a temporary table is created which contains 'VOCAB 9 4.2'. If the XML string also contains some spatial data as a search query term, a second temporary table is created which contains the spatial data.

Each temporary table is then joined with a corresponding stored (and non-temporary) table in the database (e.g. with one of tables 702-706 and 710-712 shown in FIG. 7) to perform the search and identify any nodes (referenced by their node IDs) that match the search query term (block 808). These non-temporary tables in the database may also be referred to as 'pre-existing tables'.

Where more than one temporary table is generated (in block 806), the results from each temporary table operation (in block 808) are combined using an appropriate operator as defined within the XML string (e.g. AND or OR) to identify a set of nodes that match the full search query (block 810). The data which is returned by the database (block 812) comprises the datasets for the nodes and the vocabulary data for those datasets (as specified in table 712).

Using the example shown in FIG. 7, if the results of performing the search (in blocks 802-810) identified node #A, the database would return the dataset for node #A (dataset record 704) and the vocabulary data for Vocab IDs #B, #C, #D, i.e. the user-understandable terms as stored in table 711.

The use of temporary tables as described above (and shown in FIG. 8) which only exist during the search (they are automatically deleted at the end of the stored procedure) provides a fast and efficient way of performing a search without making the database any larger in size.

Where multiple datasets are returned in response to a search query (in block 812) these results may be returned in any order. In some examples, the datasets may be ranked. There are many known ways of ranking search results, however, in other examples the spatial data and/or the vocabularies may be used in determining the ranking of datasets. In a first example, the ranking may be based on the spatial overlap between the dataset and the spatial term within the search query (e.g. using a percentage overlap). In such an example referring back to FIG. 7, if the search query term contained a spatial query corresponding to one of the two areas for node #A stored in the spatial table 706, the results would be ranked lower compared to a situation where the search query term contained both areas for node #A stored in table 706 (a 100% overlap).

In a second example, the ranking may be based on vocabularies, for example based on the percentage of the vocabulary matched. For example, if the search query contained the vocabulary term corresponding to 'VOCAB 3 1.1.1', the search may return datasets which were characterized by 'VOCAB 3 1.1' and results characterized by 'VOCAB 3 1.1.1'. As datasets characterized by 'VOCAB 3 1.1.1' have larger overlap with the search query (100% in this example, i.e. the overlap occurs at a leaf rather than higher up the tree), they would be ranked higher than those datasets characterized by 'VOCAB 3 1.1'.

In examples where both spatial data and vocabularies are used in performing the ranking, a weighting may be applied such that spatial data overlap may be considered more significant than vocabulary overlap, or vice versa.

Figure 9:
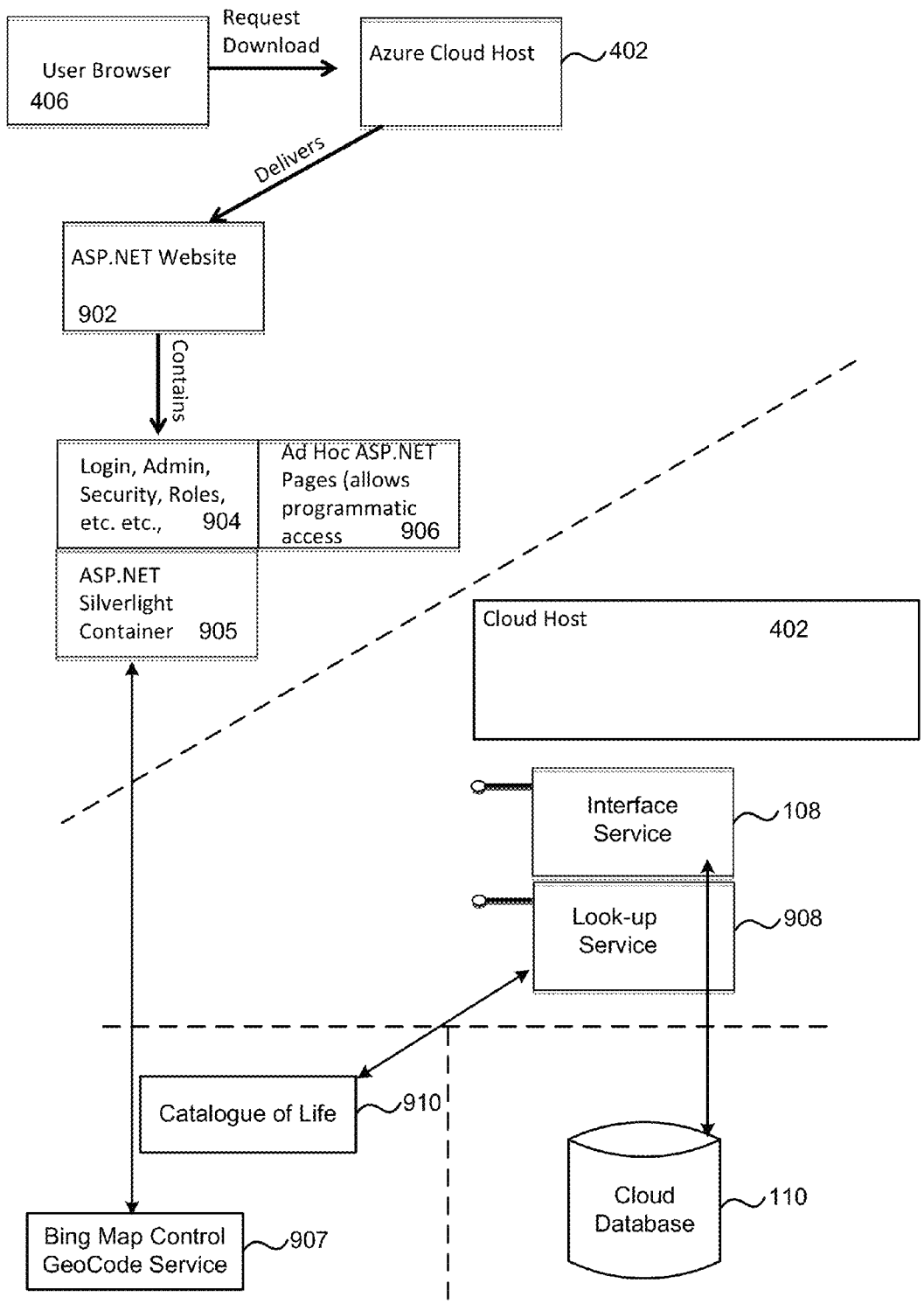
FIG. 9 shows a more detailed example implementation of a system which may be used to implement an iterative search method as described herein.

FIG. 9 shows a more detailed example implementation of a system which may be used to implement the iterative search method described above. Common reference numerals have been used where elements of the system correspond to elements shown in FIGS. 1 and 4 described above. The user browser 406 connects to a host 402 (a Microsoft® Windows Azure™ host in this example) to request a download and in response the host delivers a website 902 (an ASP.NET website in this example) which contains a number of elements 904-906 including an administrative element 904 dealing with login, admin, security, roles, etc, and an ASP.NET Silverlight (or HTML5) container 905. This container 905 provides the application which enables users to enter data or vocabularies, query the database or update the database and also interfaces to external mapping services 907 such as Bing Map Control and a GeoCode service. A further element 906 (Ad Hoc ASP.NET Pages) is optional and allows programmatic access.

At a lower level, the host 402 provides one or more WCF services such as a WCF service 108 (IMapBuildersql) which interfaces to the cloud database 110 (as described above) and a second WCF service 908 (IColLookup) which pulls in data from an external data source 910, such as the Catalogue of Life.

Figure 10:
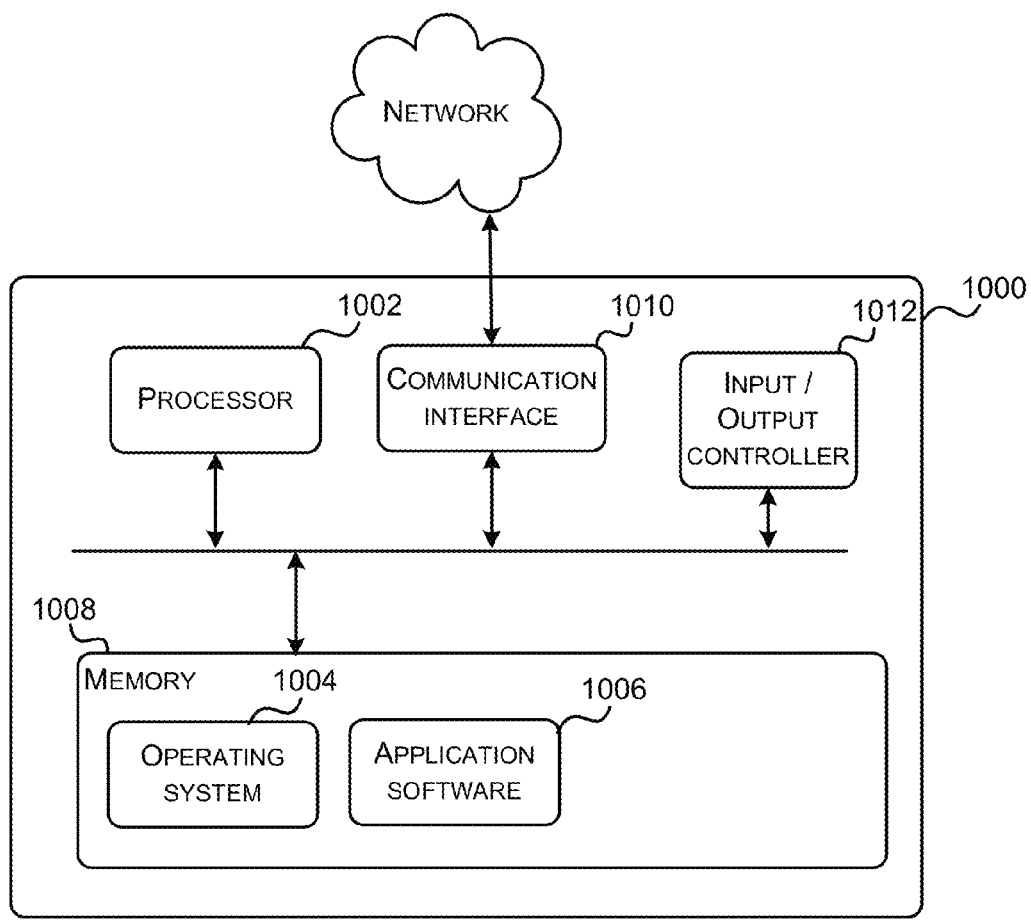
FIG. 10 illustrates an exemplary computing-based device in which embodiments of the methods described herein may be implemented.

FIG. 10 illustrates various components of an exemplary computing-based device 100 which may be implemented as any form of a computing and/or electronic device, and in which embodiments of the methods described above may be implemented. In particular, the computing-based device 1000 may provide a host 402 or a database 110 (e.g. a SQL server).

Computing-based device 1000 comprises one or more processors 1002 which may be microprocessors, controllers or any other suitable type of processors for processing computer executable instructions to control the operation of the device in order to perform aspects of the searching methods described above. In some examples, for example where a system on a chip architecture is used, the processors 1002 may include one or more fixed function blocks (also referred to as accelerators) which implement a part of the method of searching in hardware (rather than software or firmware). Platform software comprising an operating system 1004 or any other suitable platform software may be provided at the computing-based device to enable application software 1006 to be executed on the device.

The computer executable instructions may be provided using any computer-readable media that is accessible by computing based device 1000. Computer-readable media may include, for example, computer storage media such as memory 1008 and communications media. Computer storage media, such as memory 1008, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Although the computer storage media (memory 1008) is shown within the computing-based device 1000 it will be appreciated that the storage may be distributed or located remotely and accessed via a network or other communication link (e.g. using communication interface 1010).

The application software 1006 will be different depending on whether the computing-based device 1000 is operating as a host or a database. If the computing-based device is operating as a host, the application software 1006 will include any services (e.g. services 108, 908) which run on the host.

If the computing-based device is operating as a database, the memory 1008 will also store the data including the datasets in various tables (e.g. as shown in FIG. 7), the vocabulary data and the stored procedure which parses the XML (e.g. in block 804 of FIG. 8).

The communication interface 1010 is used to enable the computing-based device 1000 to communicate with other devices (e.g. between the host 402 and the database 110 and between the host 402 and the user browser 406).

The computing-based device 1000 may also comprises an input/output controller 1012 arranged to output display information to a display device which may be separate from or integral to the computing-based device 1000. The display information may provide a graphical user interface. The input/output controller 1012 may also be arranged to receive and process input from one or more devices, such as a user input device (e.g. a mouse or a keyboard). In an embodiment the display device may also act as the user input device if it is a touch sensitive display device. The input/output controller may also output data to devices other than the display device, e.g. a locally connected printing device.

Although the present examples are described and illustrated herein as being implemented in a particular cloud-based system, the system described is provided as an example and not a limitation. As those skilled in the art will appreciate, the present examples are suitable for application in a variety of different types of database systems. In an example, the system may not be a cloud-based system. In some examples, the database may not be operated by the same entity as the host: for example a user may have their own database 110 but may use a host 402 operated by a third party to provide the application 404 and services 108, 908 which provide the search UI and interface to the database 110.

Although the methods described above relate to performing spatial search where an aspect of a dataset includes some spatial information, the methods are not limited to spatial search or datasets which include spatial information and the methods may also be applied to other types of search, such as text based searches.

In the methods described above, the use of XML strings provides one method by which heterogeneous data can be passed to the database. Use of XML is efficient; however, in other examples any mark-up language (e.g. any variant of XML) may be used. In some examples a string may be used which may then be parsed to a markup language; however, such an implementation is likely to reduce efficiency.

Furthermore, although the database is described as a SQL server, the methods may be implemented on other database technologies such as MySQL or other databases which are able to support spatial data. In some examples, a service (such as the interface service) may handle the spatial data and then any database technology may be used.

Microsoft® Silverlight® applications are used above by way of example only and in other examples, HTML5 may alternatively be used.

Many of the methods described above are referred to as methods of searching. As also described above, the ability to move elements of the search results from the results to the search specification (by directly connecting search results and search specification) enables a user to discover new things and so the methods may alternatively be referred to as methods of data discovery or exploration.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include computer storage devices comprising computer-readable media such as disks, thumb drives, memory etc and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements. It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A method for iterative spatial searching comprising:
providing, at a host server, a user interface for spatial searching;
receiving a first user input, at the host server via the user interface, defining a first search specification;
generating an XML string encapsulating the search specification and communicating the XML string to a database server via an interface service running on the host server;
receiving the XML string at the database server;
passing the XML string as a parameter to a stored procedure to generate a temporary table for each term in the search specification, wherein the stored procedure parses the XML string to perform the search;
performing a search of the database server by comparing each temporary table with a pre-existing table stored in the database server to identify any datasets satisfying the input query, the pre-existing table comprising a plurality of spatial data classified according to one or more vocabularies which are system-defined or user-defined;
returning results comprising the identified datasets and attributes associated with each identified dataset
receiving, at the host server, the results generated by the database server in response to the XML string;
displaying the results to the user in the user interface;
receiving a second user input, at the host server via the user interface, selecting one or more attributes associated with an identified dataset, the second user input iteratively refining the first search specification based on the first search result;
generating a second XML string encapsulating a second search specification, the second search specification comprising the selected one or more attributes, and communicating the second XML string to the database server via the interface service
receiving, at the database server, a second input query comprising the second XML string;
parsing the second XML string using a stored procedure to generate one or more temporary tables;

performing a search of the database server by comparing each temporary table with a pre-existing table stored in the database server to identify any datasets satisfying the second input query; and returning a second set of results comprising the identified datasets and attributes associated with each identified dataset wherein the second set of results are not a subset of the first search.

2. A method according to claim 1, further comprising:
storing a plurality of datasets at the database server, each dataset having an associated node ID; and
storing one or more vocabularies at the database server, each vocabulary for use in classifying datasets, and
storing attributes associated with a dataset indexed by node ID, wherein each attribute comprises spatial data or references an element within a vocabulary.

3. A method according to claim 2, wherein performing a search of the database server by comparing each temporary table with a pre-existing table stored in the database server to identify any datasets satisfying the input query comprises:
joining each temporary table with a pre-existing table stored in the database server to identify node IDs of datasets satisfying a term in the input query; and
where there is more than one temporary table, combining the results of the joining operations to identify node IDs of datasets satisfying the complete input query.

4. A method according to claim 1, wherein the one or more vocabularies comprise at least one system-defined vocabulary and at least one user-defined vocabulary.

5. A method according to claim 1, further comprising ranking the results returned based on the attributes associated with each identified dataset and attributes within the input query.

6. A computer storage medium storing device-executable instructions that, when executed by a device, cause a device to perform actions for iterative spatial searching comprising:
providing, at a host server, a user interface for spatial searching;
receiving a first user input, at the host server via the user interface, defining a first search specification;
generating an XML string encapsulating the search specification and communicating the XML string to a database server via an interface service running on the host server;
receiving the XML string at the database server;
passing the XML string as a parameter to a stored procedure to generate a temporary table for each term in the search specification, wherein the stored procedure parses the XML string to perform the search;
performing a search of the database server by comparing each temporary table with a pre-existing table stored in the database server to identify any datasets satisfying the input query, the pre-existing table comprising a plurality of spatial data classified according to one or more vocabularies which are system-defined or user-defined;
returning results comprising the identified datasets and attributes associated with each identified dataset
receiving, at the host server, the results generated by the database server in response to the XML string;
displaying the results to the user in the user interface;
receiving a second user input, at the host server via the user interface, selecting one or more attributes associated with an identified dataset, the second user input iteratively refining the first search specification based on the first search result;
generating a second XML string encapsulating a second search specification, the second search specification comprising the selected one or more attributes, and communicating the second XML string to the database server via the interface service
receiving, at the database server, a second input query comprising the second XML string;
parsing the second XML string using a stored procedure to generate one or more temporary tables;
performing a search of the database server by comparing each temporary table with a pre-existing table stored in the database server to identify any datasets satisfying the second input query; and
returning a second set of results comprising the identified datasets and attributes associated with each identified dataset wherein the second set of results are not a subset of the first search.

7. A computer storage medium according to claim 6, wherein the actions further comprise:
storing a plurality of datasets at the database server, each dataset having an associated node ID; and
storing one or more vocabularies at the database server, each vocabulary for use in classifying datasets, and
storing attributes associated with a dataset indexed by node ID, wherein each attribute comprises spatial data or references an element within a vocabulary.

8. A computer storage medium according to claim 7, wherein performing a search of the database server by comparing each temporary table with a pre-existing table stored in the database server to identify any datasets satisfying the input query comprises:
joining each temporary table with a pre-existing table stored in the database server to identify node IDs of datasets satisfying a term in the input query; and
where there is more than one temporary table, combining the results of the joining operations to identify node IDs of datasets satisfying the complete input query.

9. A computer storage medium according to claim 6, wherein the one or more vocabularies comprise at least one system-defined vocabulary and at least one user-defined vocabulary.

10. A method according to claim 9, wherein the user-specified vocabulary is hierarchical.

11. A computer storage medium according to claim 6, wherein the actions further comprise:
ranking the results returned based on the attributes associated with each identified dataset and attributes within the input query.

12. A method according to claim 6, wherein at least one user input comprises a location or shape on a map.

13. A system for iterative spatial searching comprising a database server and a host server, wherein the database server comprises:
an input arranged to receive a first input query comprising an XML string generated by a spatial search application in response to user input defining a first search specification;
a stored procedure arranged to receive an XML string as a parameter and to generate a temporary table for each term in the first search specification, wherein the stored procedure parses the XML string received to perform the search;
a processor;
memory arranged to store a plurality of datasets and attributes associated with those datasets in a plurality of tables, at least one dataset comprising spatial data classified according to one or more vocabularies which are system-defined or user-defined, and further arranged to store device-executable instructions that, when executed by the processor, direct the database server to perform a search by joining each temporary table with a table stored in the memory to identify any datasets satisfying the input query;

an output arranged to return results comprising the identified datasets and attributes associated with each identified dataset;

the input further arranged to receive a second input query comprising an XML string generated by a search application in response to user input defining a second search specification, the second search specification iteratively refining the first search specification based on the returned results of the first input query; and the output further arranged to return results based on the second input query which are not a subset of the results returned based on the first input query.

14. A system according to claim 13, wherein each dataset comprises spatial data.

15. A system according to claim 13, wherein the memory is further arranged to store at least one vocabulary comprising a schema for classifying datasets and wherein each attribute comprises spatial data associated with a dataset or references an element within a vocabulary.

16. A system according to claim 13, wherein the host server comprises:

a processor;

an input for receiving first user input data from a user browser, the first user input data defining the first search specification; and memory arranged to store device-executable instructions that, when executed by the processor, direct the processor to provide a user interface for searching and in response to receiving first user input data, to generate an XML string encapsulating the search specification; and an output for communicating the XML string to the database server.

17. A system according to claim 16, wherein:

the input is further arranged to receive the results generated by the database server in response to the XML string;

the memory is further arranged to store device-executable instructions that, when executed by the processor, direct the processor:

to display the results to a user in the user interface; and in response to receiving at least second user input data via the input, the at least second user input data identifying one or more attributes associated with a dataset from the results, to generate at least a second XML string encapsulating at least a second search specification, the at least second search specification comprising the selected one or more attributes, and wherein the output is further arranged to communicate the at least second XML string to the database server to trigger a further search.

18. A system according to claim 17, wherein the memory is further arranged to store device-executable instructions that, when executed by the processor, direct the processor to display, with the results, to the user in the user interface, an option to remove the first search specification before submitting the second user input data.

* * * * *